(12) United States Patent
LaMotte

(10) Patent No.: US 6,334,464 B1
(45) Date of Patent: Jan. 1, 2002

(54) DUMP VALVE FOR A HIGH PRESSURE FLUID SYSTEM

(75) Inventor: Robert R. LaMotte, Waterloo, NE (US)

(73) Assignee: Meylan Enterprises, Omaha, NE (US)

( * ) Notice: Subject to any disclaimer, the term of this patent is extended or adjusted under 35 U.S.C. 154(b) by 230 days.

(21) Appl. No.: 09/002,808

(22) Filed: Jan. 5, 1998

(51) Int. Cl.$^7$ .......................... F17D 1/14; F16K 31/122
(52) U.S. Cl. ...................... 137/885; 251/63.5
(58) Field of Search ................ 251/58, 61.2, 61.3, 251/61.4, 61.5, 62, 63, 63.5, 63.6; 137/872, 885; 92/165 R

(56) References Cited

U.S. PATENT DOCUMENTS

| | | | | |
|---|---|---|---|---|
| 784,354 A | * | 3/1905 | Sewall | 251/63 |
| 1,319,404 A | * | 10/1919 | Bong et al | 251/63.5 |
| 1,647,826 A | * | 11/1927 | Feeley et al. | 251/63 |
| 1,923,788 A | * | 8/1933 | Mastenbrook | 251/61.4 |
| 2,892,608 A | * | 6/1959 | Collins | 251/61.4 |
| 3,161,400 A | * | 12/1964 | Floyd | 251/63.5 |
| 3,188,048 A | * | 6/1965 | Sutherland | 251/63.6 |
| 3,563,508 A | * | 2/1971 | DeLorenzo | 251/63.5 |
| 3,633,619 A | * | 1/1972 | Eckerlin | 137/885 |
| 4,011,892 A | * | 3/1977 | Kowalski | 251/63.5 |
| 4,014,510 A | * | 3/1977 | Smith | 251/63 |
| 4,356,833 A | * | 11/1982 | Mayfield, Jr. et al. | 251/63.6 |
| 4,989,640 A | * | 2/1991 | Steffes et al. | 137/872 |
| 5,320,280 A | * | 6/1994 | Murphy et al. | 137/885 |
| 5,778,918 A | * | 7/1998 | McLelland | 251/63.6 |

\* cited by examiner

*Primary Examiner*—John Rivell
(74) *Attorney, Agent, or Firm*—Zarley, McKee, Thomte, Voorhees & Sease; Dennis L. Thomte

(57) ABSTRACT

A dump valve for a high pressure fluid line includes a base, a fitting secured to the base and adapted to be interposed along the high pressure fluid line. The fitting defined an internal manifold having a dump port in communication with the manifold. A hydraulic or pneumatic cylinder is mounted on the base at a position for forcing a valve member into a valve closed position in engagement with a valve seat within the dump port. The fluid cylinder exerts a continuous force to maintain the valve member in the valve closed position against the urging of fluid pressure within the manifold. In an emergency condition, the fluid cylinder allows the valve member to withdraw from the valve seat, thereby ejecting pressurized fluid from the dump port.

11 Claims, 4 Drawing Sheets

DUMP VALVE FOR A HIGH PRESSURE FLUID SYSTEM

BACKGROUND OF THE INVENTION

1. Technical Field

This invention relates generally to high pressure water or air systems and more particularly to a dump valve operative to immediately substantially reduce or eliminate pressurized flow at the outlet to prevent damage or injury without shutting down the source of pressurized fluid.

2. Description of the Prior Art

In any fluid system including a high pressure pump, it may be difficult or impossible to immediately depressurize the system to avoid damage or injury. In a water blasting concrete removal machine, for example, where one or more high pressure water nozzles are strategically moved in a pattern across a concrete surface to remove a predetermined depth of concrete, it may be critical to immediately cut the pressure in the system. This may be necessary to avoid damage upon encountering unexpectedly weak concrete or upon the machine advancing out of the targeted area needing repair. Likewise, pressure would have to be immediately cut upon a person slipping and falling into the path of the machine, for example. In other types of high pressure systems, other emergencies such as a blast of fluid from an accidental leak may require that system pressure be immediately cut off.

One solution is to deactivate the high pressure pump, but that would not likely provide immediate pressure relief. Furthermore, in industrial settings, such shutdown of the high pressure pump can result in significant downtime and lost production.

Another solution is to provide a dump valve through which system pressure can be exhausted. Known dump valves for high pressure water or air systems have shortcomings which limit their effectiveness, however. Many include O-rings or gaskets which deteriorate over time and with use. Such valves require regular maintenance to avoid leakage or failure. Other dump valves have to be manually opened and therefore require undue time for accessing the valve and manually opening it.

Accordingly, a primary object of the invention is to provide an improved dump valve for a high pressure fluid system.

Another object is to provide a dump valve which may be remotely operated for immediate opening of the valve.

Another object is to provide a dump valve which includes no O-rings or gaskets.

Another object is to provide a dump valve which is operative to immediately cut system pressure without shutting down the high pressure pump, thereby enabling quick system restoration once the emergency condition has been resolved.

Another object is to provide a dump valve which requires no regular maintenance and which has no parts requiring replacement.

Finally, an object of the invention is to provide a dump valve which is simple and rugged in construction, economical to manufacture and efficient in operation.

SUMMARY OF THE INVENTION

The dump valve of the present invention includes a base and a fitting secured to the base and adapted to be interposed along a high pressure fluid line. The fitting defines an internal manifold having an inlet and an outlet adapted for connection to the high pressure fluid line for flow of high pressure fluid through the manifold. The fitting further includes a dump port in fluid communication with the manifold. A valve seat is arranged within the dump port and has an opening in fluid communication with the manifold. An extendable and retractable fluid cylinder is mounted on the base in spaced relation from the fitting and has a valve member mounted thereon for movement between a valve closed position in engagement with the valve seat, closing the opening in the dump port, and a valve open position in spaced relation from the valve seat whereby high pressure fluid in the manifold is ejected from the dump port upon movement of the valve member to the valve open position.

The dump valve of the invention may be used in high pressure water or air systems. Likewise, the extendable and retractable fluid cylinder may be hydraulic or pneumatic. That fluid cylinder applies a continuous force to hold the valve member in the valve closed position against the urging of high pressure fluid in the manifold.

In one embodiment, a female valve seat within the dump port has a frustoconical valve surface which flares outwardly toward the male valve member which has a frustoconical valve surface that tapers toward the valve seat.

The dump valve of the invention can be made in sizes ranging from tiny to large to accommodate flows as little as one half gallon per minute at five hundred pounds per square inch, for example, to flows as much as one thousand or more gallons per minute and pressures on the order of twenty thousand pounds per square inch. The valve seats may be of any size to accommodate a given system and the fluid cylinders likewise may be of any size to maintain the valve closed against the system pressure.

DESCRIPTION OF THE PREFERRED EMBODIMENT

Figure 1:
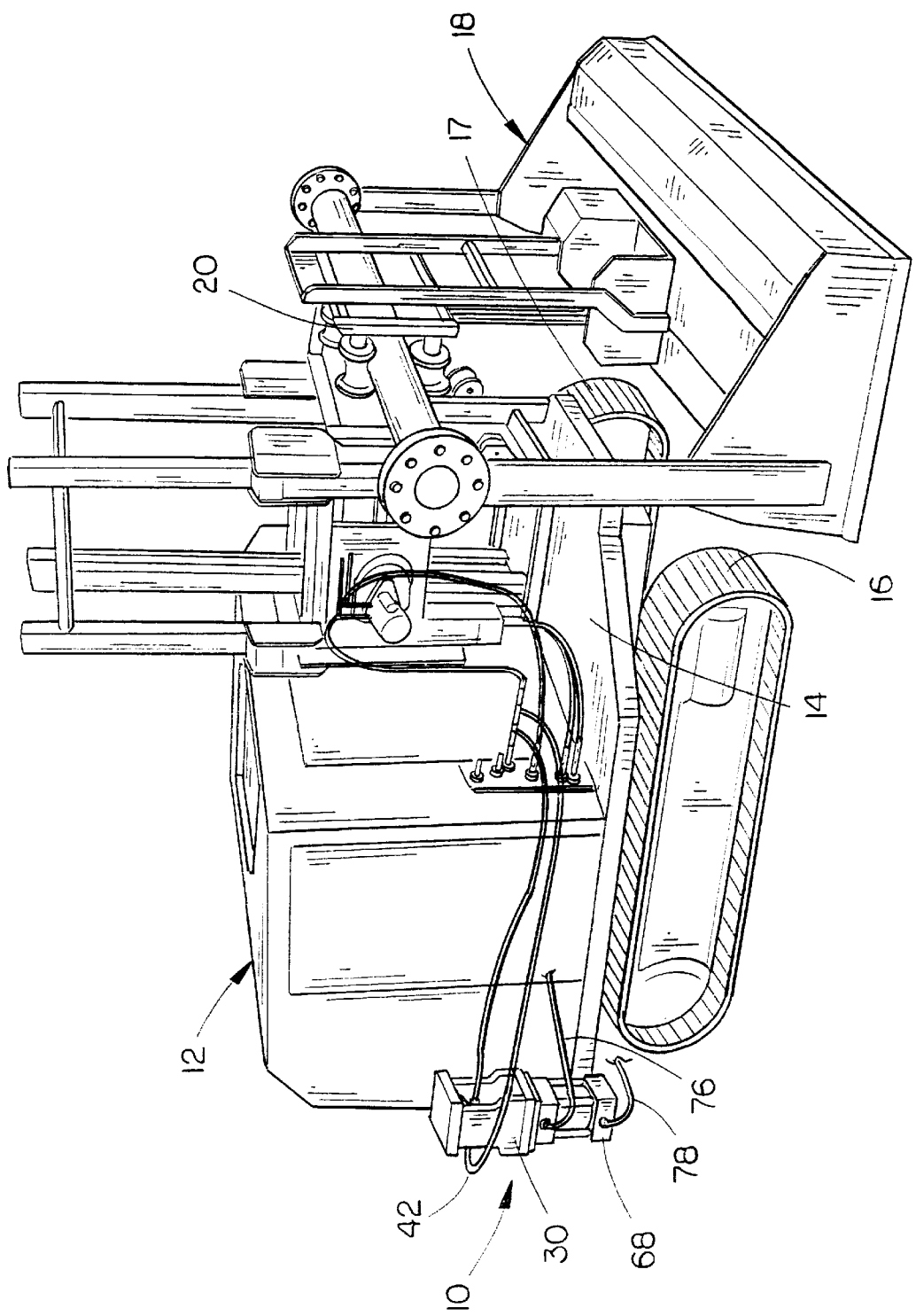
FIG. 1 is a perspective view of a concrete removal machine equipped with the dump valve of the invention.

The dump valve 10 of the present invention is illustrated in FIG. 1 installed on a concrete removal machine 12 as one example of a high pressure fluid system for which the dump valve 10 is well suited.

The concrete removal machine 12 has a frame 14 mounted on crawler tracks 16 and 17 for advancing a head 18 across a concrete surface. Head 18 carries a down turned high pressure water nozzle mounted on a trolley 20 for reciprocal back and forth lateral movement on the head 18. The water pressure and lateral speed of the nozzle and the extent of advancement of the machine in response to each lateral cycle of the nozzle determine the depth of concrete removed as the machine traverses a concrete surface.

The dump valve 10 enables system pressure at the nozzle to be immediately eliminated without shutting down the high pressure pump of the machine. Accordingly, once an emergency condition such as irregular concrete or a fallen worker is resolved, the dump valve 10 can be closed to immediately restore system pressure to the nozzle for continued operation of the machine with minimum downtime.

Figure 2:
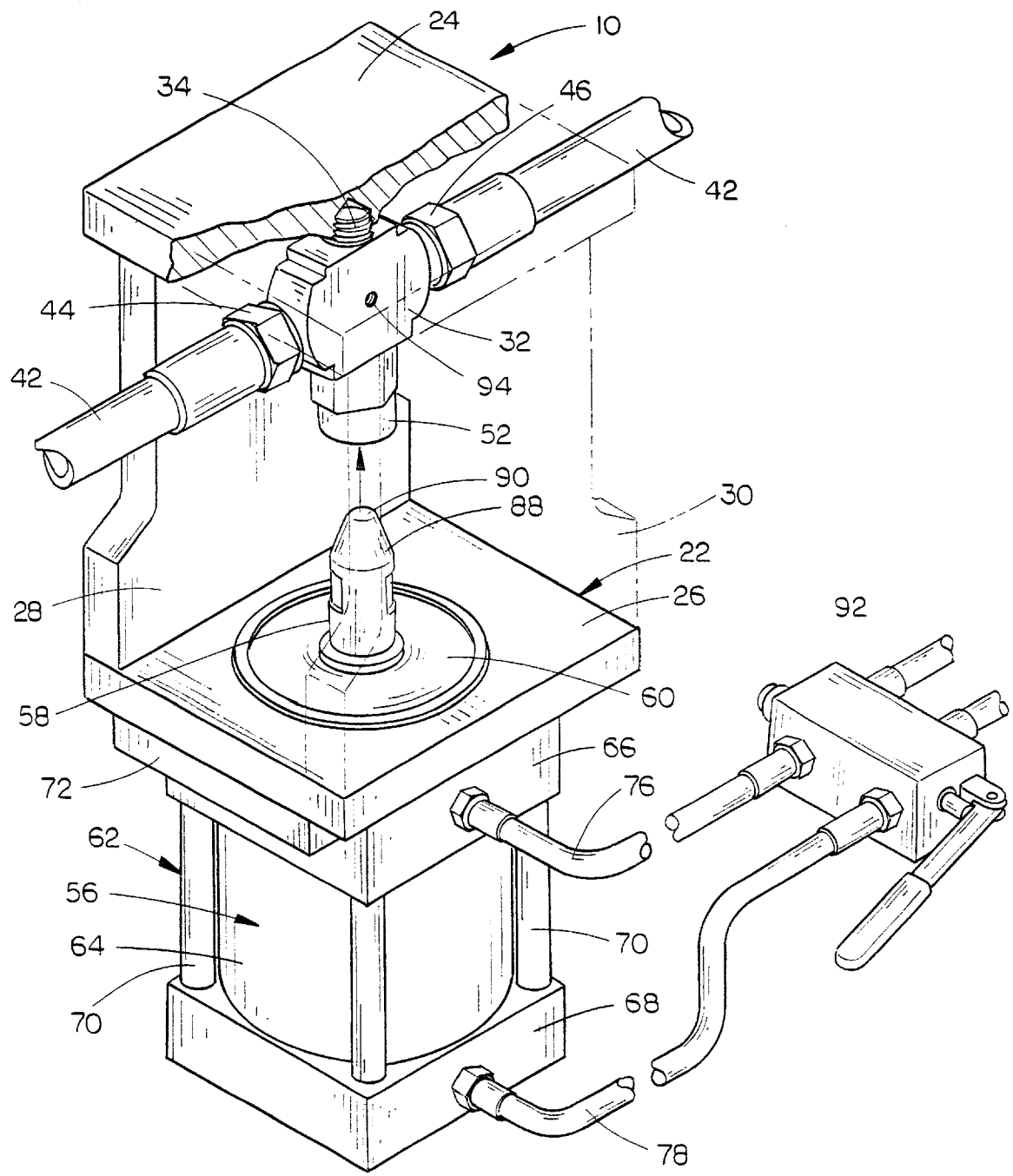
FIG. 2 is a perspective view of the dump valve showing the various connections of the fluid lines.
Figure 3:
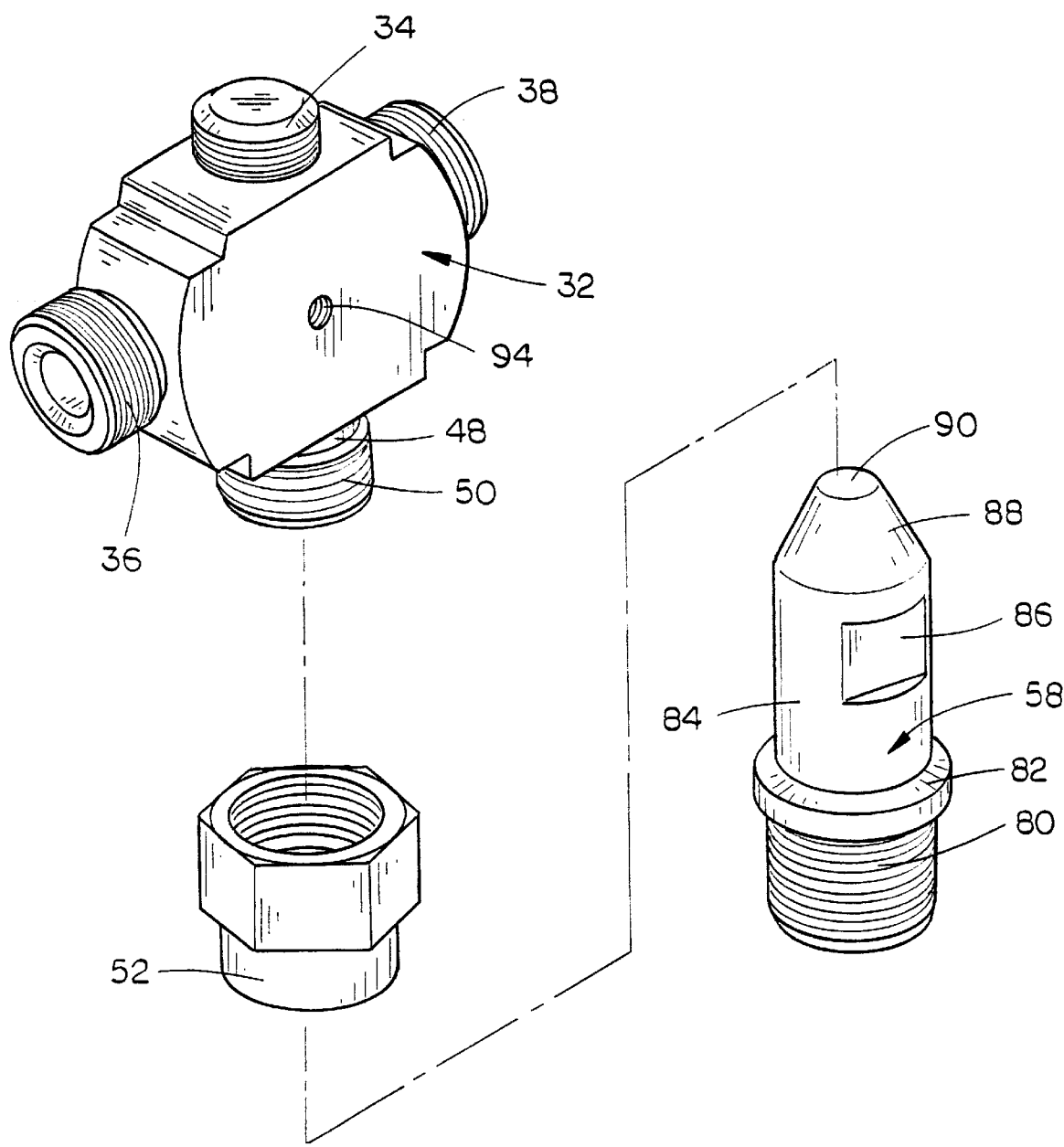
FIG. 3 is an exploded perspective view of critical parts of the dump valve.

FIG. 2 shows that the dump valve 10 includes a base 22 which, in the illustrated embodiment, is a housing including a top wall 24, bottom wall 26 and opposite side walls 28 and 30. A fitting 32 is secured by a threaded mounting stud 34 to top wall 24. It could alternately be affixed by welding or any other suitable fasteners so long as it is fixedly secured relative to the housing 22. FIG. 3 shows that the fitting has a threaded inlet 36, an opposite threaded outlet 38, both of which communicate with an internal through manifold 40. In the illustrated embodiment, the fitting 32 is interposed along a high pressure water line 42 having couplings 44 and 46 for connection to the fitting inlet 36 and outlet 38 respectively. Accordingly, high pressure fluid in line 42 flows through manifold 40.

Manifold 40 also defines a dump port 48 which extends downwardly or outwardly from manifold 40 through a threaded neck 50. A valve seat adapter 52 is threaded onto neck 50 and defines an open bottomed frustoconical valve surface 54 which flares downwardly and outwardly away from manifold 40. In an alternate embodiment, the valve surface 54 could be formed in the dump port neck 50 without a separate valve seat adapter 52.

The opposite or bottom wall 26 of housing 22 has a fluid cylinder 56 mounted thereon so that a valve member 58 carried on the fluid cylinder ram 60 is aligned with the valve seat 54 for closing the dump port 48 during normal operation of the high pressure fluid system of which the high pressure water line 42 is a part.

Figure 4:
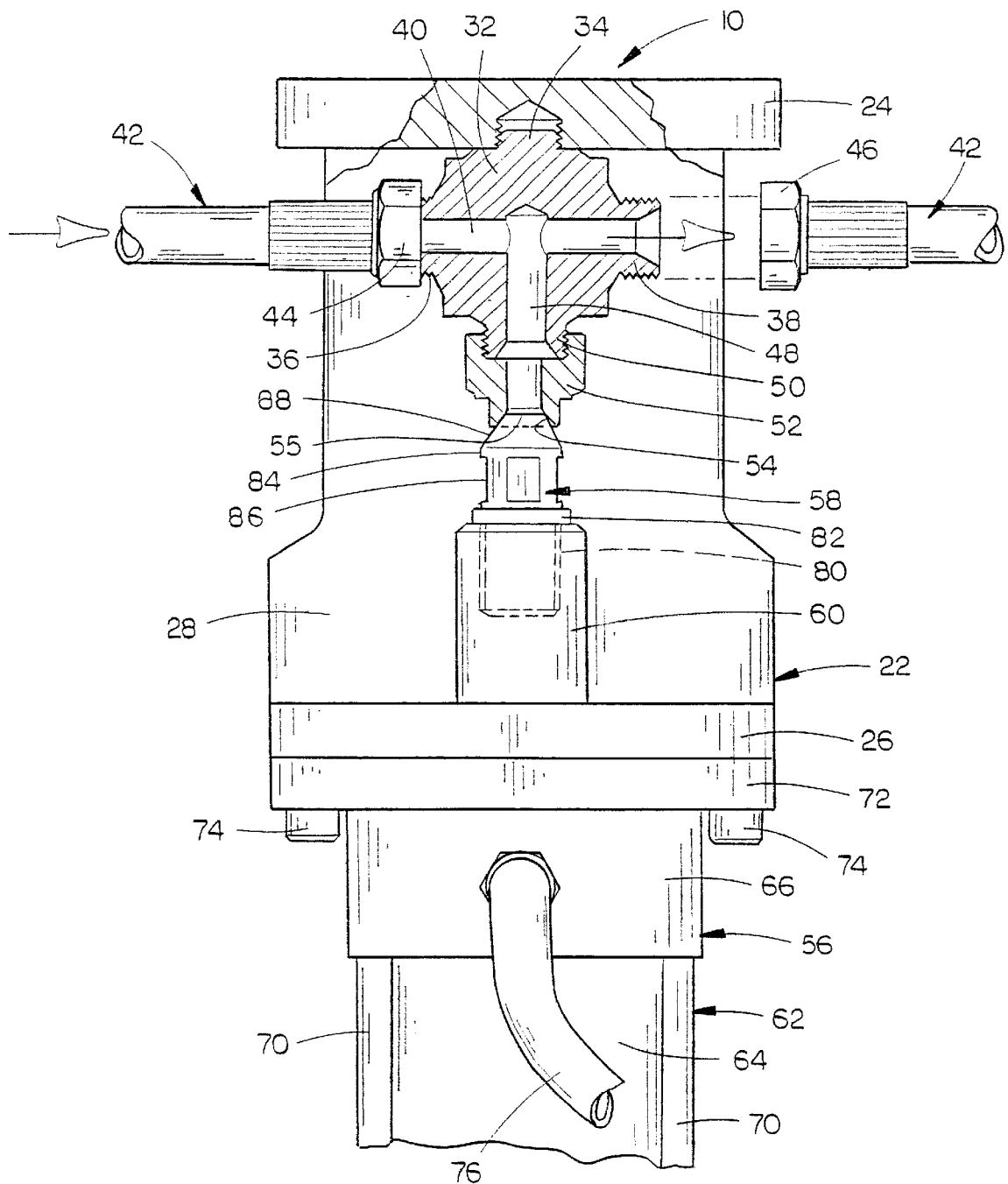
FIG. 4 is a side elevational view with portions broken away to illustrate the interior manifold and ports of the dump valve.

As shown best in FIGS. 2 and 4, the cylinder end 62 of fluid cylinder 56 includes a cylindrical sidewall 64 sandwiched between a top cap 66 and bottom cap 68 by connecting links 70. Top cap 66 is secured to mounting plate 72 which, in turn, is secured to the housing bottom wall 26, such as by allen bolts 74 or by any other suitable fastening means. Hydraulic or pneumatic supply lines 76 and 78 are connected to top and bottom caps 66 and 68 respectively to raise and lower ram 60.

The manner in which the movement of cylinder ram 60 is accomplished is well known. Cylinder ram 60 includes a piston within the cylindrical side wall 64 which defines two sealed chambers; one in communication with top cap 66 and one in communication with bottom cap 68. Control valve 92 simultaneously directs continuous hydraulic or pneumatic pressure through supply lines 76 or 78 while relieving pressure in the remaining lines. The hydraulic or pneumatic pressure in the selected sealed chamber maintains the cylinder ram 60 in an extended or retracted position.

Valve member 58, as shown best in FIG. 3, is machined as a stud including a threaded end 80 for connection to ram 60 and a stop collar 82 at the upper end of threaded end 80. A solid rod portion 84 extends upwardly from stop collar 82 and includes opposite flats 86 for rotating the valve member with a wrench. A frustoconical valve surface 88 tapers upwardly to a blunt end surface 90. The angle of inclination of valve surface 88 matches that of the valve seat valve surface 54 for fluid tight mating engagement between the valve surfaces.

The fluid cylinder 56 is situated relative to housing 22 so that valve member 58 is aligned with the valve seat adapter 52 for reciprocal movement of the valve member 58 between the valve closed position of FIG. 4 wherein the valve surface 88 of valve member 58 is in mating engagement with the valve surface 54 of valve seat 52 to close the opening 55 through valve seat 52, thereby closing the dump port 48.

During the normal operation of the high pressure system of which high pressure water line 42 is a part, fluid cylinder 56 exerts a continuous force to hold the valve member 58 in the valve closed position against the urging of high pressure fluid in manifold 40.

In response to an emergency situation, a control valve 92 (FIG. 2) is actuated to immediately withdraw ram 60 thereby moving valve member 58 to the valve open position of FIG. 2 in spaced relation from valve seat 52, with the result that high pressure fluid in manifold 40 is ejected from the dump port 48. This immediately relieves the pressure within high pressure water line 42 to avert damage or injury which might otherwise occur if pressure were not immediately relieved.

For outdoor applications or in a well drained indoor industrial facility, it is likely acceptable to allow the ejected fluid to simply exhaust onto the ambient ground or floor surface. In other situations, it may be preferable to enclose the housing 22 and provide an outlet port connectable to a hose for directing the ejected fluid to a safe remote location or drain.

Upon resolution of the emergency condition, control valve 92 is again actuated to force ram 60 and valve member 58 back to the valve closed position for closing and sealing dump port 48, whereby pressure is immediately restored for flow through high pressure water line 42.

Fitting 32 may additionally have a threaded pressure gauge port 94 formed through one wall thereof for fluid communication with manifold 40 so that the fluid pressure within the manifold will be disclosed on a gauge connected to gauge port 94.

It is apparent that the overall size of dump valve 10 may be varied drastically to accommodate any give high pressure system. A small system may have flow of one half gallon per minute at 500 pounds per square inch (psi) or less whereas a large system, for example, may have flow in excess of 1000 gallons per minute and pressure exceeding 20,000 psi. It is preferred that the opening 55 through valve seat 52 be substantially as large as the cross sectional area of manifold 40 to enable immediate pressure release within the system. The fluid cylinder 56 may be of any desired size and capacity so long as it is capable of holding the valve member 58 in the valve closed position against the urging of whatever fluid pressure is developed in the high pressure fluid system to which the fitting 32 is connected. The smaller the valve seat opening, the less force is required to maintain the valve member in the valve closed position.

Whereas the invention has been shown and described in connection with a preferred embodiment thereof, it is apparent that many alterations, modifications and substitutions may be made which are within the intended broad scope of the appended claims.

I claim:

1. A dump valve for a high pressure fluid line, comprising:
   a base;
   a fitting secured to said base and adapted to be interposed along said high pressure fluid line, said fitting defining an internal manifold having an inlet and an outlet adapted for connection to said high pressure fluid line for flow of high pressure fluid having a pressure of at least 500 p.s.i. through said manifold, and a dump port in communication with said manifold;
   a valve seat in said dump port having a frustoconical surface and an opening in fluid communication with said manifold;
   a fluid cylinder mounted on said base in movable communication with an extendable and retractable fluid cylinder ram; and a valve member having a frustoconical surface adapted to mate with the frustoconical surface of the valve seat, mounted on said fluid cylinder ram and movable by said fluid cylinder ram between a valve closed position in engagement with said valve seat and closing said opening, and a valve open position in spaced relation from said valve seat whereby high pressure fluid in said manifold is ejected from said dump port upon movement of said valve member to the valve open position.

2. The dump valve of claim 1 wherein said fluid cylinder ram is operative to apply continuous force to hold said valve member in the valve closed position thereof against the urging of high pressure fluid in said manifold.

3. The dump valve of claim 2 wherein said base comprises a housing having a top wall, bottom wall and opposite side walls, said fitting being secured to said top wall and said fluid cylinder being mounted on said bottom wall.

4. The dump valve of claim 3 wherein said fluid cylinder is a pneumatic cylinder.

5. The dump valve of claim 3 wherein said fluid cylinder is an hydraulic cylinder.

6. The dump valve of claim 3 wherein said frustoconical valve surface of said valve seat flares outwardly toward said valve member and said frustoconical valve surface of said valve member tapers toward said valve seat.

7. The dump valve of claim 3 wherein said opening is centered relative to said valve seat.

8. The dump valve of claim 1 wherein said inlet, outlet, manifold, valve seat and valve member are operative to remain leakproof upon flow of fluid through said manifold within a pressure range of 1000 psi to approximately 50,000 psi.

9. In combination, a high pressure fluid line, and a dump valve, comprising:

a base;

a fitting secured to said base and adapted to be interposed along said high pressure fluid line, said fitting defining an internal manifold having an inlet and an outlet adapted for connection to said high pressure fluid line for flow of high pressure fluid having a pressure of at least 500 p.s.i. through said manifold, and a dump port in communication with said manifold, a valve seat in said dump port having a frustoconical surface and an opening in fluid communication with said manifold, a fluid cylinder mounted on said base in movable communication with an extendable and retractable fluid cylinder ram; and a valve member having a frustoconical surface adapted to mate with the frustoconical surface of the valve seat, mounted on said fluid cylinder ram and movable by said fluid cylinder ram between a valve closed position in engagement with said valve seat and closing said opening, and a valve open position in spaced relation from said valve seat whereby high pressure fluid in said manifold is ejected from said dump port upon movement of said valve member to the valve open position.

10. The combination of claim 9 wherein said high pressure fluid line contains pressurized water.

11. The combination of claim 9 wherein said high pressure fluid line contains pressurized air.

* * * * *